US009178635B2

(12) United States Patent
Ben-Shlomo

(10) Patent No.: US 9,178,635 B2
(45) Date of Patent: Nov. 3, 2015

(54) SEPARATION OF COMMUNICATION SIGNAL SUB-BANDS IN DISTRIBUTED ANTENNA SYSTEMS (DASS) TO REDUCE INTERFERENCE

(71) Applicant: Corning MobileAccess Ltd., Airport City (IL)

(72) Inventor: Dror Ben-Shlomo, Modiin (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 92 days.

(21) Appl. No.: 14/146,964

(22) Filed: Jan. 3, 2014

(65) Prior Publication Data
US 2015/0195055 A1     Jul. 9, 2015

(51) Int. Cl.
*H04J 1/12*   (2006.01)
*H04L 5/14*   (2006.01)
*H04L 1/00*   (2006.01)
*H04W 52/40*   (2009.01)

(52) U.S. Cl.
CPC ... *H04J 1/12* (2013.01); *H04L 1/00* (2013.01); *H04L 5/143* (2013.01); *H04L 5/1423* (2013.01); *H04L 5/1461* (2013.01); *H04W 52/40* (2013.01)

(58) Field of Classification Search
CPC ........... H04L 5/14; H04L 5/1423; H04L 5/16; H04W 52/40; H04W 84/12; H04W 80/04; H04W 88/06; H04W 74/08; H04W 84/18; H04B 7/0617; H04B 7/04
See application file for complete search history.

(56) References Cited

U.S. PATENT DOCUMENTS

| | | | |
|---|---|---|---|
| 4,365,865 A | 12/1982 | Stiles | |
| 4,449,246 A | 5/1984 | Seiler et al. | |
| 4,573,212 A | 2/1986 | Lipsky | |
| 4,665,560 A | 5/1987 | Lange | |

(Continued)

FOREIGN PATENT DOCUMENTS

| | | |
|---|---|---|
| AU | 645192 B | 10/1992 |
| AU | 731180 B2 | 3/1998 |

(Continued)

OTHER PUBLICATIONS

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.

(Continued)

*Primary Examiner* — Warner Wong

(57) ABSTRACT

Separation of sub-bands of communications signals to reduce interference in distributed antenna systems (DASs) is disclosed. A sub-band separation circuit coupled to a plurality of antennas is configured to distribute and receive and transmit a pair of downlink and uplink sub-band signals. The sub-band separation circuit is coupled to a duplexed port of a remote unit that distributes uplink communications signals to the DAS and receives downlink communications signals from the DAS. In order to isolate the downlink communications signals from the uplink communications path in the remote unit, the isolation circuit includes a plurality of sub-band isolation circuits. Each sub-band isolation circuit is configured to isolate at least one sub-band of the downlink communications signal to generate a downlink sub-band signal that has a desired frequency separation or gap with uplink communication signals received at the duplexed port.

24 Claims, 8 Drawing Sheets

(56) References Cited

U.S. PATENT DOCUMENTS

| | | |
|---|---|---|
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |

(56) References Cited

U.S. PATENT DOCUMENTS

| | | |
|---|---|---|
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Martin et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B2 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |

(56) References Cited

U.S. PATENT DOCUMENTS

| | | |
|---|---|---|
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,213,401 B2 | 7/2012 | Fischer et al. |
| 8,223,795 B2 | 7/2012 | Cox et al. |
| 8,238,463 B1 | 8/2012 | Arslan et al. |
| 8,270,387 B2 | 9/2012 | Cannon et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,201 B1 | 4/2013 | Mchann, Jr. et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,634,766 B2 | 1/2014 | Hobbs et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2* | 10/2014 | Oren et al. .......... 370/480 |
| 8,909,133 B2 | 12/2014 | Hobbs et al. |
| 8,929,288 B2 | 1/2015 | Stewart et al. |
| 2001/0036163 A1 | 11/2001 | Sabat, Jr. et al. |

(56) References Cited

U.S. PATENT DOCUMENTS

| | | |
|---|---|---|
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |

(56) References Cited

U.S. PATENT DOCUMENTS

| | | |
|---|---|---|
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0067402 A1* | 3/2009 | Forenza et al. ............... 370/343 |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |

(56) References Cited

U.S. PATENT DOCUMENTS

| | | |
|---|---|---|
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0177026 A1 | 7/2012 | Uyehara et al. |
| 2013/0012195 A1 | 1/2013 | Sabat, Jr. et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2013/0273854 A1* | 10/2013 | Zhang et al. ............... 455/67.11 |
| 2014/0016583 A1 | 1/2014 | Smith |
| 2014/0072064 A1 | 3/2014 | Lemson et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2015/0016441 A1* | 1/2015 | Hanson et al. ............... 370/338 |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2081334 A1 | 7/2009 |
| EP | 2276298 A1 | 1/2011 |
| EP | 1570626 B1 | 11/2013 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A1 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A1 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2009029077 A1 | 3/2009 |
| WO | 2006046088 A1 | 5/2009 |
| WO | 2010022156 A2 | 2/2010 |
| WO | 2010090999 A1 | 8/2010 |
| WO | 2010126667 A1 | 11/2010 |
| WO | 2010132739 A1 | 11/2010 |
| WO | 2011023592 A1 | 3/2011 |
| WO | 2011100095 A1 | 8/2011 |
| WO | 2011139939 A1 | 11/2011 |
| WO | 2012058061 A1 | 5/2012 |
| WO | 2012148938 A1 | 11/2012 |
| WO | 2012148940 A1 | 11/2012 |

(56) References Cited

FOREIGN PATENT DOCUMENTS

WO 2013096563 A1 6/2013
WO 2013122915 A1 8/2013

OTHER PUBLICATIONS

Biton et al., "Challenge: CeTV and Ca-Fi—Cellular and Wi-Fi over Catv," Proceedings of the Eleventh Annual International Conference on Mobile Computing and Networking, Aug. 28-Sep. 2, 2005, Cologne, Germany, Association for Computing Machinery, 8 pages.
Non-Final Office Action for U.S. Appl. No. 13/948,536, mailed Jan. 16, 2015, 13 pages.
International Search Report for PCT/IL2014/050657, mailed Dec. 1, 2014, 4 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Author Unknown, RFID Technology Overview, Date Unknown, 11 pages.
Opatic, D., "Radio over Fiber Technology for Wireless Access," Ericsson, Oct. 17, 2009, 6 pages.
Paulraj, a.J., et al., "An Overview of Mimo Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellularconnectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-Das versus Mimo-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

(56) References Cited

OTHER PUBLICATIONS

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.

Author Unknown, "VCSEL Chaotic Synchronization and Modulation Characteristics," Master's Thesis, Southwest Jiatong University, Professor Pan Wei, Apr. 2006, 8 pages. (machine translation).

Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.

\* cited by examiner

SEPARATION OF COMMUNICATION SIGNAL SUB-BANDS IN DISTRIBUTED ANTENNA SYSTEMS (DASS) TO REDUCE INTERFERENCE

BACKGROUND

The technology of the present disclosure relates generally to distributed antenna systems (DASs) for distributing communications services to remote areas each forming a coverage area and particularly to separation of communications signal sub-bands in DASs to reduce interference.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to remote coverage areas 10 of a DAS 12. In this regard, the remote coverage areas 10 are created by and centered on remote units 14 connected to a head-end equipment (HEE) 16 (e.g., a head-end controller or head-end unit). The head-end equipment 16 may be communicatively coupled to a base station 18. In this regard, the head-end equipment 16 receives downlink communications signals 20D from the base station 18 to be distributed to the remote units 14. The remote units 14 are configured to receive downlink communications signals 20D from the head-end equipment 16 over a communications medium 22 to be distributed to the remote coverage areas 10 of the remote units 14. Each remote unit 14 may include an RF transmitter/receiver (not shown) and an antenna 24 operably connected to the RF transmitter/receiver to wirelessly distribute the cellular services to client devices 26 within the remote coverage area 10. The remote units 14 are also configured to receive uplink communications signals 20U from the client devices 26 in the remote coverage area 10 to be distributed to the base station 18. The size of a given remote coverage area 10 is determined by the amount of RF power transmitted by the remote unit 14, the receiver sensitivity, antenna gain and the RF environment, as well as by the RF transmitter/receiver sensitivity of the client device 26. Client devices 26 usually have a fixed RF receiver sensitivity, so that the above-mentioned properties of the remote unit 14 mainly determine the size of the remote coverage areas 10.

The equipment in the DAS 12 in FIG. 1 may be provided to support wide radio bands of spectrum commonly used in the cellular industry. For example, a personal communications services (PCS) band may be supported by the DAS 12 that includes the 1850-1910 MegaHertz (MHz) radio band for uplink signals and 1930-1990 MHz band for downlink signals. A cellular radio band may also be supported by the DAS 12 that includes the 824-859 MHz radio band for uplink signals and the 869-894 MHz band for downlink communications signals. In this regard, it may be required to couple a base station to a DAS, such as DAS 12 in FIG. 1, through a duplexed port. A duplexed port allows a DAS to simultaneously receive downlink communications signals into the DAS and transmit uplink communications signals from the DAS.

In this regard, FIG. 2 illustrates exemplary downlink and uplink path circuits 28D, 28U provided in respective downlink and uplink communications paths 30D, 30U in the DAS 12 of FIG. 1. The downlink and uplink communications paths 30D, 30U extend between the base station 18 and a plurality of remote units 14(1)-14(M). The base station 18 is coupled to the DAS 12 via a duplexed port 32. The duplexed port 32 receives downlink communications signals 20D from the base station 18 to be provided to the DAS 12 via the HEE 16 in this example. The duplexed port 32 also receives uplink communications signals 20U from the DAS 12 via the HEE 16 to be provided to the base station 18. A head-end duplexer 34(H) is provided in the HEE 16. The head-end duplexer 34(H) is coupled to the duplexed port 32. The head-end duplexer 34(H) is configured to separate a duplexed downlink and uplink communications path 36 into the separate downlink communications path 30D and a separate uplink communications path 30U. Downlink communications signals 20D are coupled from the head-end duplexer 34(H) to the head-end downlink circuits 28D(H). The downlink communications signals 20D are then distributed from the head-end downlink circuits 28D(H) to the remote downlink circuits 28D(R) in each remote unit 14 to be transmitted through the antenna 24 of the remote unit 14. The uplink communications signals 20U are coupled from the antenna 24 of the remote unit 14 to a remote duplexer 34(R), and from the remote duplexer 34(R) to the remote uplink circuits 28U(R). The uplink communications signals 20U are distributed to the head-end uplink circuits 28U(H), and from the head-end duplexer 34(H) to the base station duplexed port 38.

With continuing reference to FIG. 2, due to expansion of radio bands, the frequency gap between downlink communications signals 20D and the uplink communications signals 20U supported in the DAS 12 may become smaller. For example, the frequency gap between the downlink communications signals 20D and the uplink communications signals 20U may be 10 MHz or less. If a frequency gap between the downlink communications signals 20D and the uplink communications signals 20U is too small, it may be difficult or even impossible to provide the required isolation between the downlink and uplink communications paths 30D, 30U in each remote duplexer 34(R) while maintaining other requirements of the remote duplexer 34(R), such as low attenuation, lower ripple (i.e., variance in frequency response), small size, and/or low cost. If the isolation provided by each remote duplexer 34(R) is lower than required, a portion of the downlink communications signal 20D can leak through the remote duplexer 34(R) to the uplink communications path 30U, as shown by leakage path 40 in FIG. 2. This leakage through the uplink communications path 30U might distort the uplink communications signal 20U or even create oscillations on the uplink communications signal 20U.

SUMMARY

Embodiments disclosed herein include separation of sub-bands of communications signals to reduce interference in distributed antenna systems (DASs). Related devices and methods of separation of sub-bands of communications signals, including, without limitation, radio frequency (RF) signals, in DASs are also disclosed. A sub-band separation circuit coupled to a plurality of antennas is provided, with the sub-band separation circuit configured to distribute and receive and transmit a pair of downlink and uplink sub-band signals via each antenna. The sub-band separation circuit is coupled to a duplexed port of a remote unit that distributes uplink communications signals to the DAS and receives downlink communications signals from the DAS to be communicated over the antenna of the remote unit. In order to isolate the downlink communications signals from the uplink communications path in the remote unit, the isolation circuit includes a plurality of sub-band isolation circuits. Each sub-band isolation circuit is configured to isolate at least one sub-band of the downlink communications signal to generate a downlink sub-band signal that has a desired frequency separation or gap with uplink communication signals received at the duplexed port.

In this manner, the isolation provided by the sub-band separation circuit between the downlink and uplink communications paths increases the frequency gap between each pair of downlink and uplink communications signals for each sub-band isolation circuit. Therefore, the DAS employing the sub-band separation circuit may be used to support communications services where the frequency gap between the downlink and uplink communications signals is small (e.g., $<=10$ MHz) that may otherwise cause distortion in the downlink and/or uplink communications signals if a single duplexer were employed.

In this regard, in one embodiment, a sub-band separation circuit for providing band separation between sub-bands of downlink communications signals and uplink communications signals in a remote unit of DAS is provided. The sub-band separation circuit comprises a downlink splitter. The downlink splitter is configured to receive a downlink communications signal having a downlink bandwidth comprising a plurality of downlink communications sub-bands on a downlink splitter input. The downlink splitter is further configured to split the received downlink communications signal into a plurality of split downlink communications signals on a plurality of splitter outputs. The sub-band separation circuit further comprises a plurality of sub-band isolation circuits. Each sub-band isolation circuit comprises a downlink isolation circuit. Each downlink isolation circuit is configured to receive a split downlink communications signal among the plurality of split downlink communications signals from a split output among the plurality of splitter outputs. Each downlink isolation circuit is further configured to isolate at least one downlink communications sub-band among the plurality of downlink communications sub-bands in the split downlink communications signal to generate a communications sub-band signal. Each sub-band isolation circuit further comprises a duplexer. Each duplexer is configured to receive the communications sub-band signal on a downlink duplexer input. Each duplexer is further configured to receive an uplink communications signal on an antenna interface coupled to an antenna. Each duplexer is further configured to pass the communications sub-band signal to the antenna interface.

In another embodiment, a method providing band separation between sub-bands of downlink communications signals and uplink communications signals in a remote unit of a DAS is disclosed. The method comprises receiving a downlink communications signal having a downlink bandwidth comprising a plurality of downlink communications sub-bands on a downlink splitter input. The method further comprises splitting the received downlink communications signal into a plurality of split downlink communications signals. The method further comprises, for each split downlink communications signal, isolating at least one downlink communications sub-band among the plurality of downlink communications sub-bands in the split downlink communications signal to generate a communications sub-band signal. The method further comprises passing each communications sub-band signal to an antenna interface of a respective duplexer.

In another embodiment, a DAS is disclosed. The DAS comprises head end equipment (HEE) and a plurality of remote units. Each remote unit is configured to receive at least one downlink communications signal from the HEE and transmit at least one uplink communications signal to the HEE. Each remote unit comprises a sub-band separation circuit for providing band separation between sub-bands of the at least one downlink communications signal and the at least one uplink communications signal in the remote unit. Each sub-band separation circuit comprises a downlink splitter. The downlink splitter is configured to receive a downlink communications signal having a downlink bandwidth comprising a plurality of downlink communications sub-bands on a downlink splitter input. The downlink splitter is further configured to split the received downlink communications signal into a plurality of split downlink communications signals on a plurality of splitter outputs. Each sub-band separation circuit further comprises a plurality of sub-band isolation circuits. Each sub-band isolation circuit comprises a downlink isolation circuit. Each downlink isolation circuit is configured to receive a split downlink communications signal among the plurality of split downlink communications signals from a split output among the plurality of splitter outputs. Each downlink isolation circuit is further configured to isolate at least one downlink communications sub-band among the plurality of downlink communications sub-bands in the split downlink communications signal to generate a communications sub-band signal. Each sub-band isolation circuit further comprises a duplexer. Each duplexer is configured to receive the communications sub-band signal on a downlink duplexer input. Each duplexer is further configured to receive an uplink communications signal on an antenna interface coupled to an antenna. Each duplexer is further configured to pass the communications sub-band signal to the antenna interface.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims. The accompanying drawings are included to provide a further understanding and are incorporated in and constitute a part of this specification. The drawings illustrate one or more embodiment(s), and together with the description serve to explain the principles and operation of the various embodiments.

DETAILED DESCRIPTION

Various embodiments will be further clarified by the following examples.

Embodiments disclosed herein include separation of sub-bands of communications signals to reduce interference in distributed antenna systems (DASs). Related devices and methods of separation of sub-bands of communications signals, including, without limitation, radio frequency (RF) signals, in DASs are also disclosed. A sub-band separation circuit coupled to a plurality of antennas is provided, with the sub-band separation circuit configured to distribute and receive and transmit a pair of downlink and uplink sub-band signals via each antenna. The sub-band separation circuit is coupled to a duplexed port of a remote unit that distributes uplink communications signals to the DAS and receives downlink communications signals from the DAS to be communicated over the antenna of the remote unit. In order to isolate the downlink communications signals from the uplink communications path in the remote unit, the isolation circuit includes a plurality of sub-band isolation circuits. Each sub-band isolation circuit is configured to isolate at least one sub-band of the downlink communications signal to generate a downlink sub-band signal that has a desired frequency separation or gap with uplink communication signals received at the duplexed port.

In this manner, the isolation provided by the sub-band separation circuit between the downlink and uplink communications paths increases the frequency gap between each pair of downlink and uplink communications signals for each sub-band isolation circuit. Therefore, the DAS employing the sub-band separation circuit may be used to support communications services where the frequency gap between the downlink and uplink communications signals is small (e.g., <10 MHz) that may otherwise cause distortion in the downlink and/or uplink communications signals if a single duplexer were employed.

Figure 1:
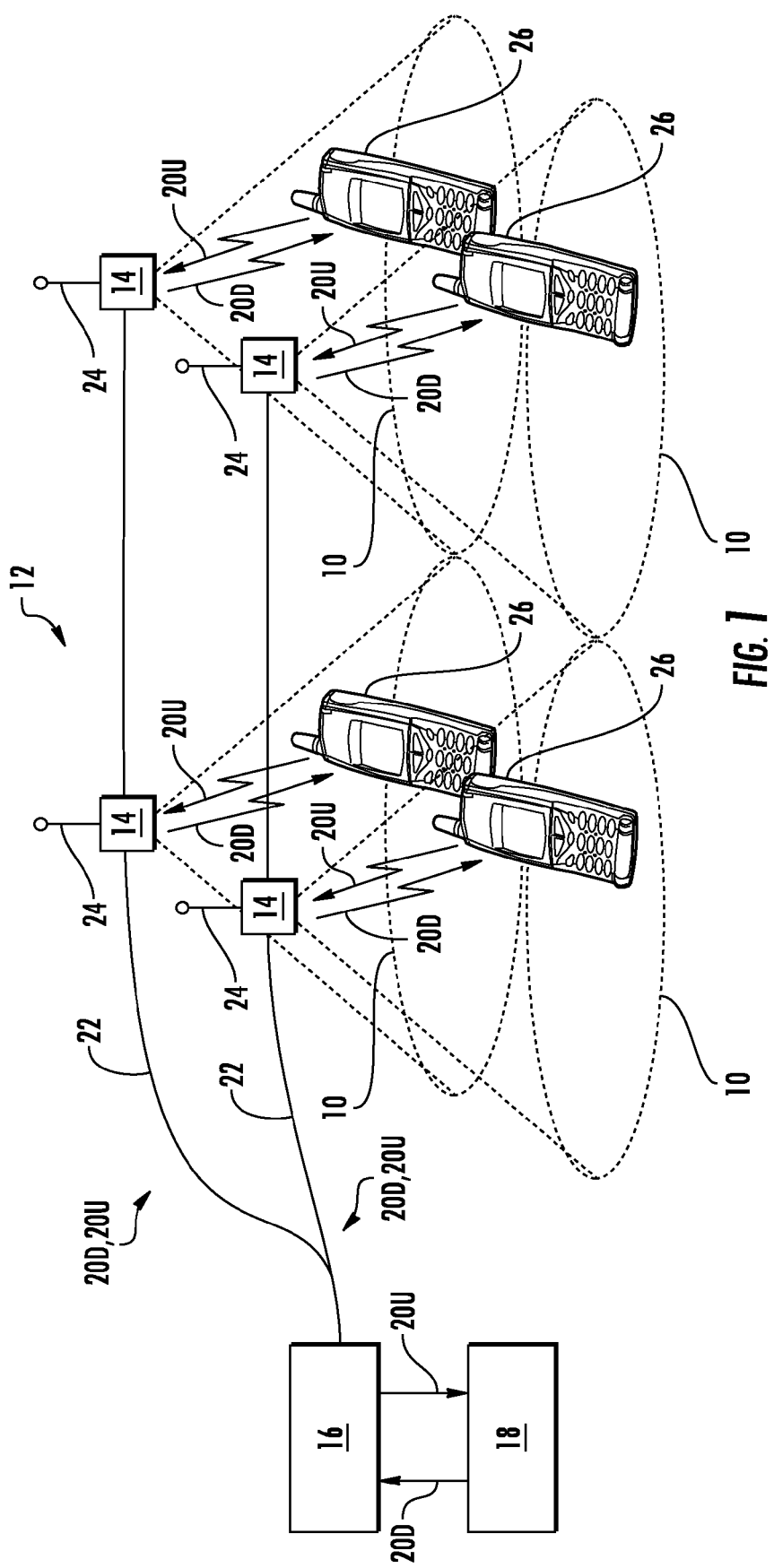
FIG. 1 is a schematic diagram of an exemplary distributed antenna system (DAS) capable of distributing wireless communications services to client devices.
Figure 2:
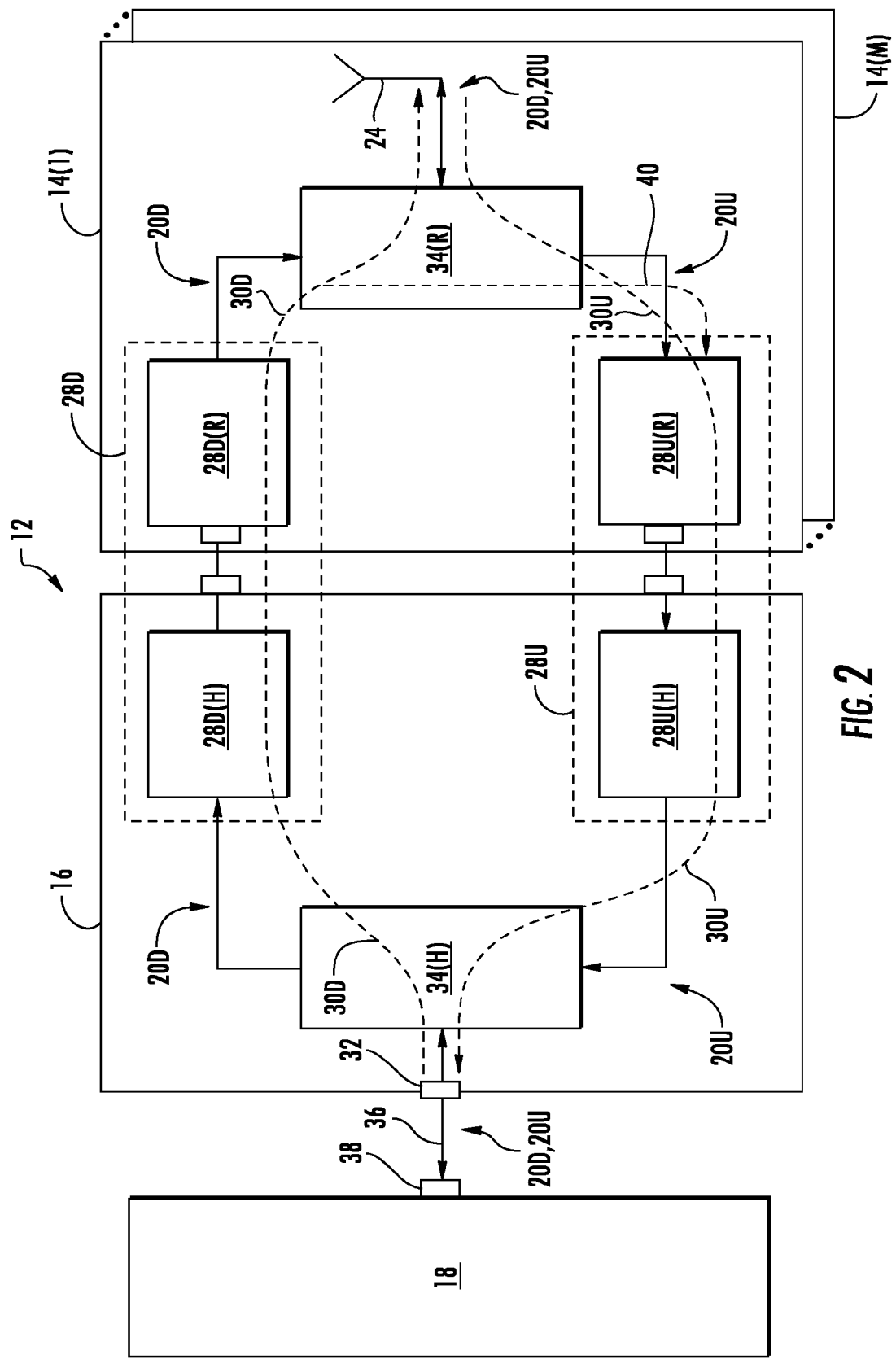
FIG. 2 is a schematic diagram illustrating exemplary downlink and uplink path circuits provided in respective downlink and uplink communications paths in the DAS of FIG. 1, wherein the downlink and uplink communications paths extend between a base station and a remote unit, and wherein the base station is coupled to the DAS via a duplexed port.
Figure 3:
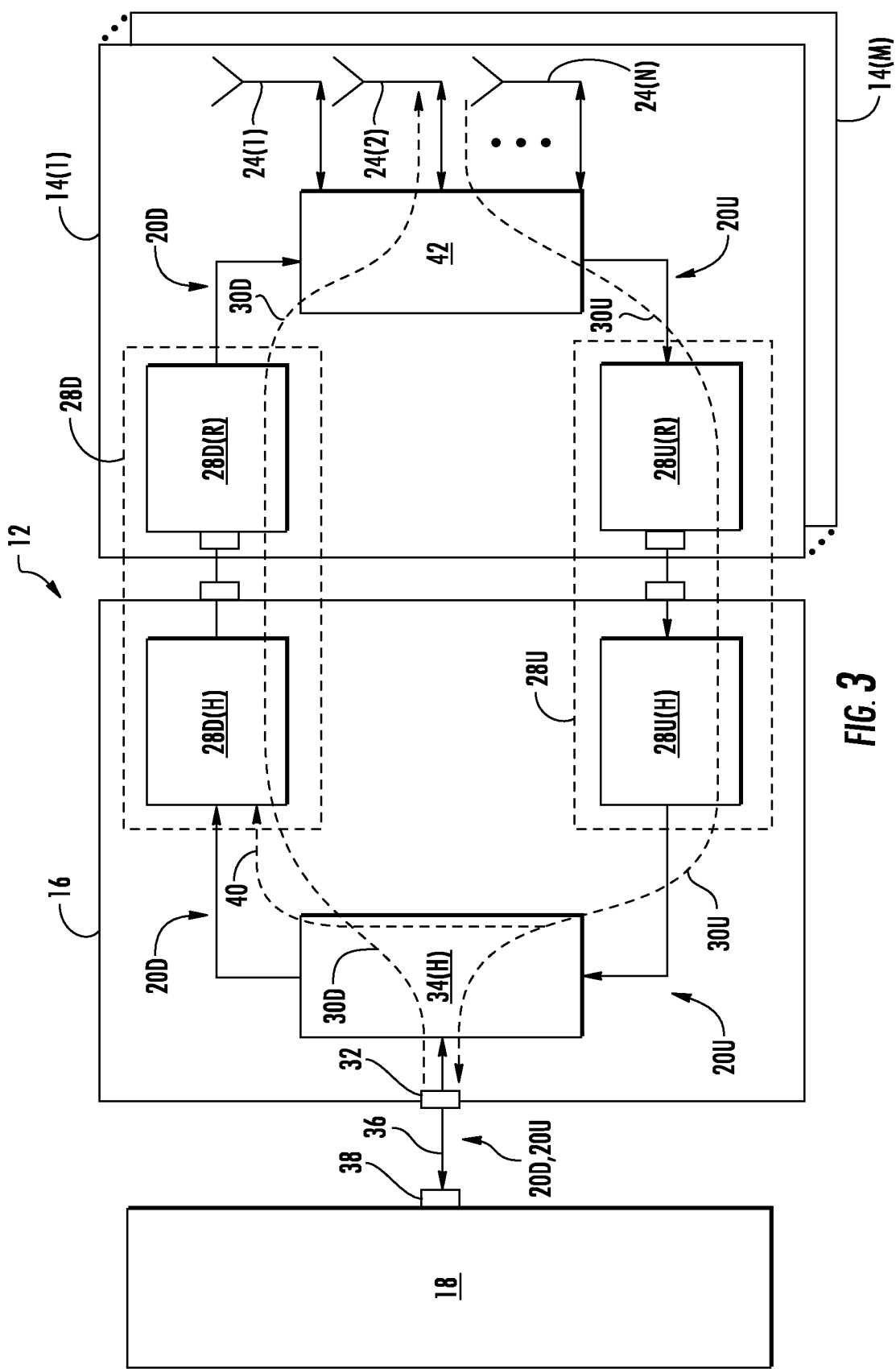
FIG. 3 is a schematic diagram illustrating exemplary downlink and uplink path circuits provided in respective downlink and uplink communications paths in a DAS, wherein each remote unit includes a sub-band separation circuit for providing band separation between sub-bands of downlink RF signals and uplink RF signals, according to an exemplary embodiment.

In this regard, FIG. 3 is a schematic diagram illustrating exemplary downlink and uplink path circuits provided in respective downlink and uplink communications paths 30D, 30U in a DAS 12, wherein each remote unit 14 includes a sub-band separation circuit 42 for providing band separation between sub-bands of downlink RF signals 20D and uplink RF signals 20U, according to an exemplary embodiment. In this embodiment, the downlink and uplink RF signals 20D, 20U are RF signals, but the devices and methods disclosed herein may be applicable to other communications signals as well. In this embodiment, the sub-band separation circuit 42 takes the place of the single duplexer 34(R) of the embodiment of FIG. 2, described in detail above, in each remote unit 14 of the embodiment of FIG. 3. Each sub-band separation circuit 42 in this embodiment includes two or more isolation circuits 1-N (not shown), described in greater detail below with respect to FIGS. 5 and 6, for isolating a specific sub-band 1-N from each of the downlink RF signal 20D and uplink RF signal 20U. Each isolation circuit is coupled to a respective antenna 24 for transmitting and receiving a sub-band 1-N of the respective isolation circuit 1-N.

Figure 4:
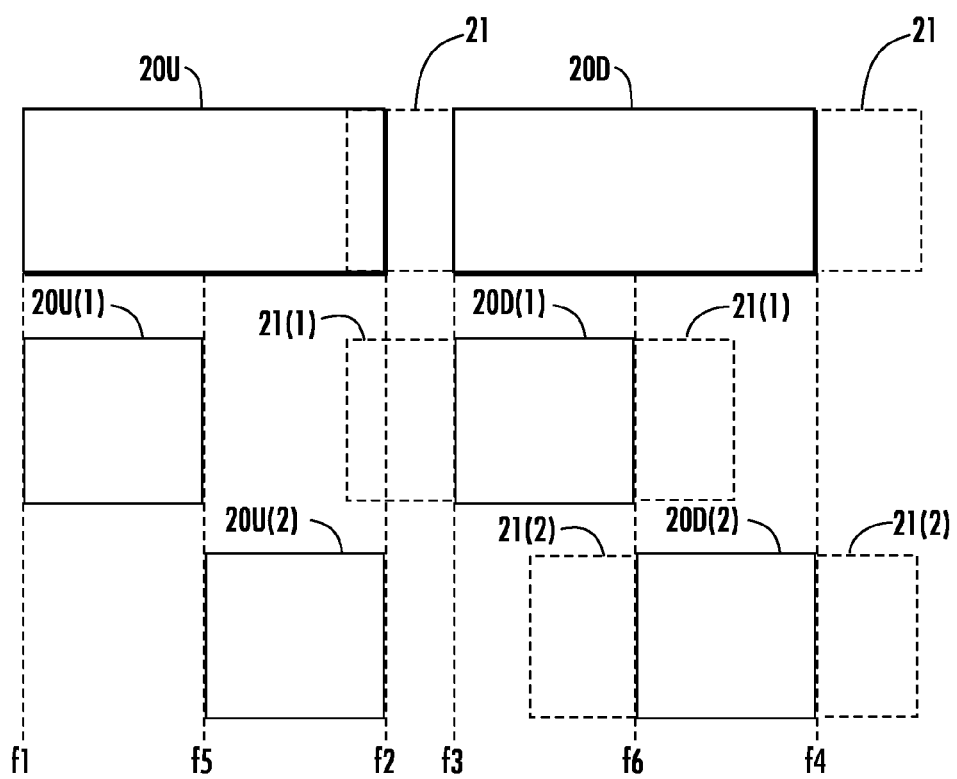
FIG. 4 is a diagram of an exemplary downlink RF signal and uplink RF signal each having a bandwidth, wherein each RF signal is divided into two sub-bands such that each downlink sub-band has frequency separation from a respective uplink sub-band greater than the frequency separation between the downlink RF signal and uplink RF signal.

FIG. 4 is a diagram of an exemplary downlink RF signal 20D and uplink RF signal 20U each having a bandwidth, wherein each RF signal is divided into two sub-bands such that each downlink sub-band 20D(1) and 20D(2) has frequency separation from a respective uplink sub-band 20U(1) and 20U(2) greater than the frequency separation between the downlink RF signal 20D and uplink RF signal 20U. In this embodiment, a simplified example having two pairs of sub-bands is described. In this embodiment, the minimum uplink frequency f1 is 1850 MHz and the maximum uplink frequency f2 is 1920 MHz. The minimum downlink frequency f3 is 1930 MHz and the maximum downlink frequency f4 is 2000 MHz. Thus, in this example, the separation between the maximum uplink frequency f2 and the minimum downlink frequency f3 is only 10 MHz. Accordingly, when using a single conventional remote duplexer 34(R) as illustrated in FIG. 2, portions of the uplink RF signal 20U that overlap with an intermode region 21 of the downlink RF signal 20D may experience interference. Thus, when the separation between downlink and uplink RF signals 20D, 20U is relatively small, preventing a portion of the downlink communications signal 20D from leaking through the remote duplexer 34(R) to the uplink communications path 30U, as shown by leakage path 40 of FIG. 2, becomes difficult.

However, as shown by FIG. 4, it is possible to divide each of the downlink and uplink RF signals 20D, 20U into separate sub-bands. In the example of FIG. 4, uplink sub-band 20U(1) is located between f1 and f5 (1850 MHz and 1885 MHz in this example), and uplink sub-band 20U(2) is located between f5 and f2 (1885 MHz and 1920 MHz in this example). Likewise, downlink sub-band 20D(1) is located between f3 and f6 (1930 MHz and 1965 MHz in this example), and downlink sub-band 20D(2) is located between f6 and f4 (1965 MHz and 2000 MHz in this example). Thus, the separation between each pair of downlink and uplink sub-band signals is larger than the frequency separation between the downlink and uplink RF signals 20D, 20U. For example, the maximum frequency of uplink sub-band signal 20U(1) is f5 (1885 MHz) and the minimum frequency of downlink sub-band signal 20D(1) is f3 (1930 MHz), resulting in a separation of 45 MHz between the downlink and uplink sub-band signals 20D(1), 20U(1). Thus, in this embodiment, there is no overlap between the uplink sub-band signal 20U(1) and the intermode region 21(1) of downlink sub-band signal 20D(1). Similarly, the maximum frequency of uplink sub-band signal 20U(2) is f2 (1920 MHz) and the minimum frequency of downlink sub-band signal 20D(2) is f6 (1965 MHz), also resulting in a separation of 45 MHz between the downlink and uplink sub-band signals 20D(2), 20U(2). Thus, there is also no overlap between the uplink sub-band signal 20U(2) and the intermode region 21(2) of downlink sub-band signal 20D(2). Accordingly, it can be seen that separating the downlink and uplink RF signals 20D, 20U into sub-band signals can allow for greater separation between individual sub-band signals, which permits easier filtering and duplexing of the individual sub-band signals.

Figure 5:
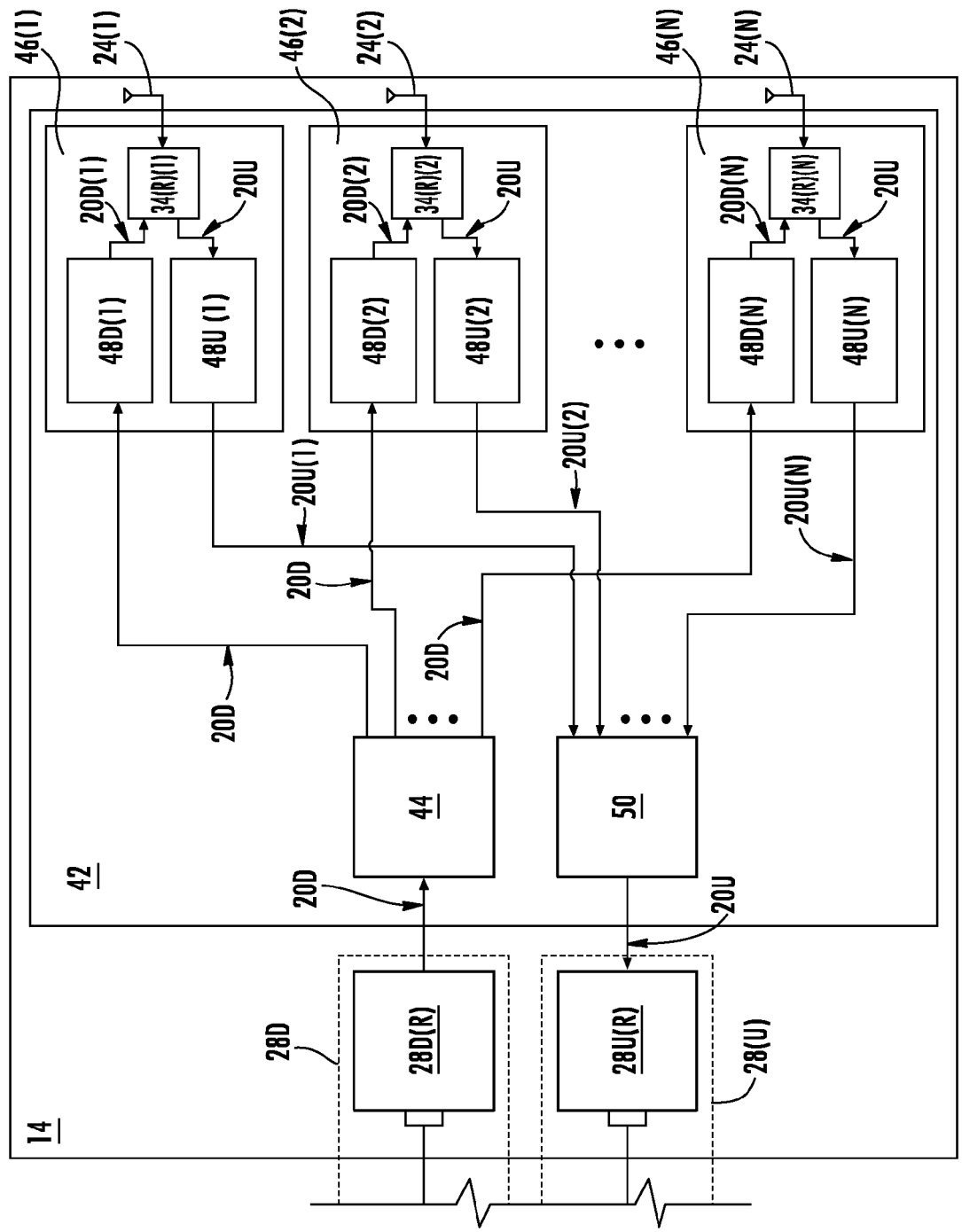
FIG. 5 is a schematic diagram illustrating a detailed view of an exemplary remote unit of FIG. 3, wherein the sub-band separation circuit comprises a plurality of sub-band isolation circuits, each comprising a downlink isolation circuit for isolating a sub-band of the downlink RF signal and an uplink isolation circuit for isolating a sub-band of the uplink RF signal.

In this regard, FIG. 5 is a schematic diagram illustrating a detailed view of an exemplary remote unit of FIG. 3, wherein the sub-band separation circuit comprises a downlink splitter 44 for splitting downlink RF signal 20D to a plurality of sub-band isolation circuits 46(1)-46(N). Each sub-band isolation circuit 46 comprises a downlink isolation circuit 48D for isolating a sub-band of the downlink RF signal 20D and an uplink isolation circuit 48U for isolating a complementary sub-band of the uplink RF signal 20U. Each downlink sub-band RF signal 20D(1)-20D(N) is then individually transmitted over a respective antenna 24(1)-24(N) via remote duplexer 34(R)(1)-34(R)(N). Meanwhile, each uplink sub-band signal 20U(1)-20U(N) is output to an uplink combiner 50, which combines the uplink sub-band signals 20U(1)-20U(N) back into the original uplink RF signal 20U.

This arrangement reduces leakage into the complementary sub-band of the uplink RF signal 20U for each downlink sub-band signal 20D(1)-20D(N), the advantages of which will be further described below. In addition, this arrangement allows each individual downlink sub-band signal 20D(1)-20D(N) to be individually amplified, thereby increasing the coverage area of each downlink sub-band signal 20D(1)-20D(N).

It should be noted that leakage from a given downlink sub-band signal 20D(N) to the uplink RF signal 20U may still occur at the respective remote duplexer 34(R)(N). For example, the minimum frequency of downlink sub-band signal 20D(1) in this embodiment is the same as the minimum frequency of the downlink RF signal 20D. Thus, the separation between downlink sub-band signal 20D(1) and uplink RF signal 20U in remote duplexer 34(R)(1) (e.g., 10 MHz), is not increased, and may result in leakage from downlink sub-band signal 20D(1) to the higher-frequency portions of uplink RF signal 20U (e.g., where N=2, uplink sub-band signal 20U(2)). However, because isolation circuit 46(1) is only concerned with uplink sub-band signal 20U(1), the frequencies most affected by the leakage from downlink sub-band signal 20D(1) (i.e., frequencies in uplink sub-band signal 20U(2) in this example) are filtered out and discarded by uplink isolation circuit 48U(1). Meanwhile, every other uplink isolation circuit 48(N) is likewise able to generate a "clean" uplink sub-band signal 20U(N) because the only potential source of downlink signal leakage is the complementary downlink sub-band signal 20D(N).

Thus, because each uplink sub-band signal 20U(1)-20U(N) is sufficiently separated from the complementary downlink sub-band signal 20D(1)-20D(N), each uplink sub-band signal 20U(1)-20U(N) generated by a respective uplink isolation circuit 48U(1)-48U(N) represents a "clean" version of that particular sub-band of the original uplink RF signal 20U. As discussed above, the plurality of uplink sub-band signals 20U(1)-20U(N) are next output to an uplink combiner 50, which reconstructs the original uplink RF signal 20U from the component uplink sub-band signals 20U(1)-20U(N) and outputs uplink RF signal 20U to uplink path circuit 28U.

In some alternative embodiments, the uplink sub-band isolation circuits 48U may be omitted. For example, because the separation of the downlink RF signal 20D into downlink sub-band signals 20D(1)-20D(N) creates separation between most of the downlink sub-band signals 20D(1)-20D(N) and the uplink RF signal 20U by itself, it may be desirable to pass the uplink RF signal 20U from one or more of the sub-band isolation circuits 46 having sufficient separation to avoid interference between the uplink RF signal 20U and the respective downlink sub-band signals 20D(1)-20D(N). For sub-band isolation circuits 46 having insufficient separation between the downlink sub-band signal 20D(1)-20D(N), any uplink RF signal 20U received from that sub-band isolation circuit 46 can simply be ignored or discarded.

As discussed above, each sub-band isolation circuit 46(1)-46(N) includes a downlink isolation circuit 48D for generating a downlink sub-band signal 20D(N) and an uplink isolation circuit 48U for generating an uplink sub-band signal 20U(N). In this regard, FIG. 6 is a schematic diagram of illustrating a detailed view of an exemplary sub-band separation circuit 42 of FIG. 5, including a schematic view of the internal components of the downlink isolation circuit 48D and uplink isolation circuit 48U of sub-band isolation circuits 46(1) and 46(2).

Before discussing exemplary downlink sub-band isolation circuit 48D(1), it should be understood that exemplary components of downlink path circuits 28D may include, for example, downlink photodiode 52, broadband amplifier 54, and broadband filter 56, for converting downlink communications signal 20D from optical to RF before being split by downlink splitter 44. Likewise, exemplary components of uplink path circuits 28D may include, for example, broadband filter 58, broadband amplifier 60, and uplink photodiode 62, for converting uplink communications signal 20U received from uplink combiner 50 from RF to optical.

Turning now to downlink sub-band isolation circuit 48D(1), the split downlink RF signal 20D is received from the downlink splitter 44 at a first downlink mixer 64(1). The mixer downconverts the downlink RF signal 20D to an intermediate frequency (IF) signal. Downlink sub-band filter 66(1) then receives the IF signal from the first downlink mixer 64(1) and passes only IF frequencies corresponding to the RF frequencies of downlink sub-band signal 20D(1) (e.g., 1950 MHz-1965 MHz). In this embodiment, the downlink RF signal 20D is downconverted to an IF band in order to more easily and more accurately filter the signals corresponding to the downlink sub-band signal 20D(1). In other embodiments, the downlink RF signal 20D may be filtered directly, without including an IF downconverting step.

Figure 6:
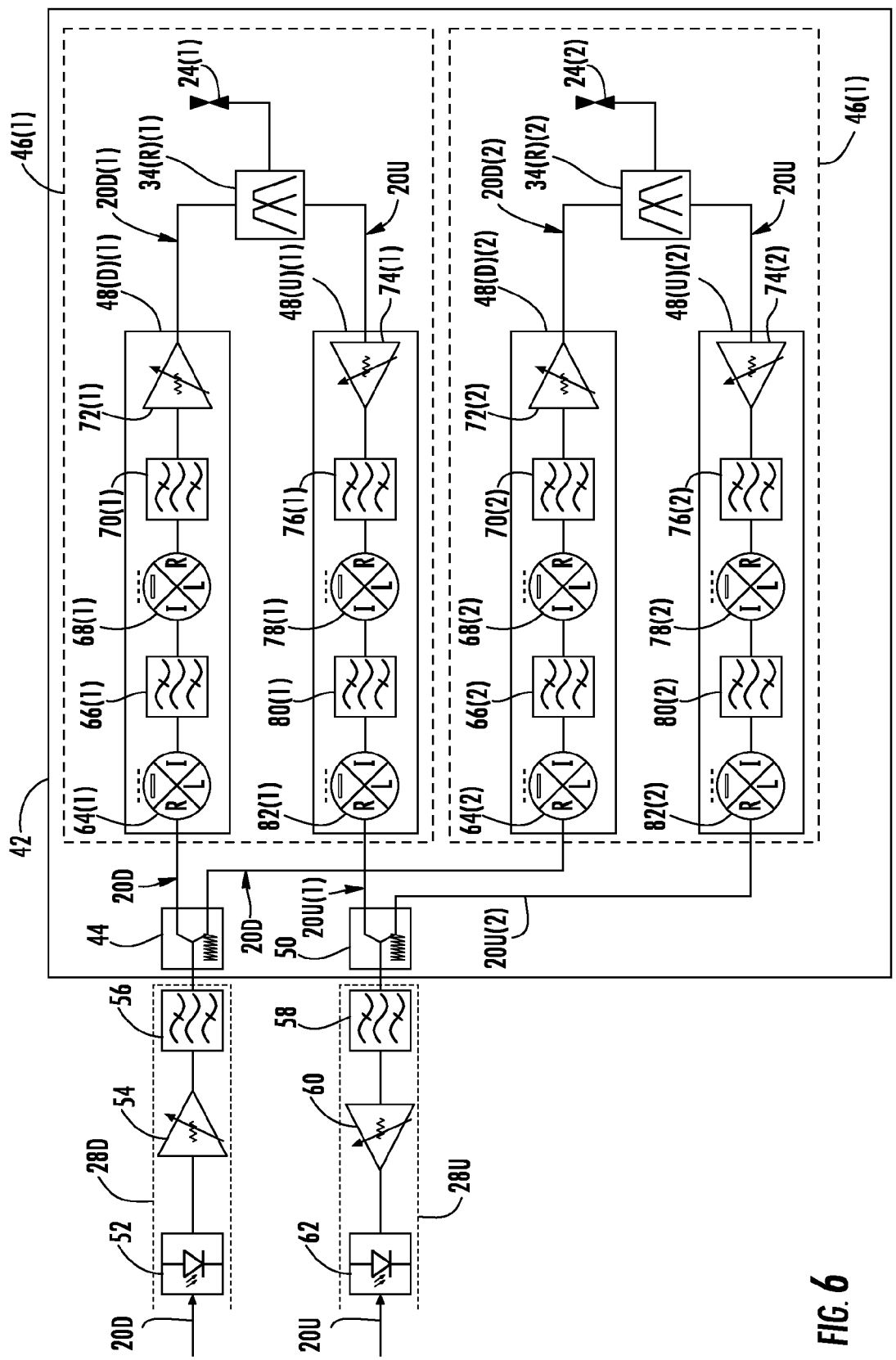
FIG. 6 is a schematic diagram illustrating a detailed view of an exemplary sub-band separation circuit of FIG. 5, including a schematic view of the internal components of the downlink isolation circuit and uplink isolation circuit of each sub-band isolation circuit.

In the embodiment of FIG. 6, the filtered IF signal is next received by a second downlink mixer 68(1), which upconverts the filtered IF signal to the downlink sub-band signal 20D(1). The downlink sub-band isolation circuit 48D(1) may also include a conventional filter 70(1) and/or power amplifier 72(1) for reducing noise and amplifying the downlink sub-band signal 20D(1) before outputting the downlink sub-band signal 20D(1) to remote duplexer 34(R)(1). In other embodiments, the filter 70(1) and/or power amplifier 72(1) may be located outside the downlink sub-band isolation circuit 48D (1), or may be omitted or replaced with suitable equivalent components.

Exemplary uplink sub-band isolation circuit 48U(1) operates in a similar manner to downlink sub-band isolation circuit 48D(1). In this embodiment, uplink RF signal 20U is received from the remote duplexer 34(R)(1) by a low noise amplifier (LNA) 74(1) and filtered by conventional filter 76(1). As discussed above, the uplink RF signal 20U may include a small amount of leakage from the downlink sub-band signal 20D(1), but this leakage is minimized by the generation of the downlink sub-band signal 20D(1). In addition, as will be discussed below, the corresponding uplink sub-band signal 20U(1) has sufficient separation from the downlink sub-band signal 20D(1) such that, if any leakage occurs, the portion of the uplink RF signal 20U affected by such leakage will not be part of the corresponding uplink sub-band signal 20U(1).

Turning back to the internal components of uplink sub-band isolation circuit 48U(1) of FIG. 6, a first uplink mixer 78(1) downconverts the uplink RF signal 20D to an intermediate frequency (IF) signal, similar to the first downlink mixer 64(1) of downlink sub-band isolation circuit 48D(1). Uplink sub-band filter 80(1) then receives the IF signal from the first uplink mixer 78(1) and passes only IF frequencies corresponding to the RF frequencies of uplink sub-band signal 20D(1) (e.g., 1850 MHz-1885 MHz). Thus, as discussed above, even if leakage from the downlink sub-band signal 20D(1) affects the higher frequencies (e.g., approximately 1920 MHz) of the uplink RF signal 20U, the maximum frequency (e.g. 1885 MHz) of the uplink sub-band signal 20U(1) is sufficiently separated from the minimum frequency (e.g., 1930 MHz) of downlink sub-band signal 20D(1) that any leakage from downlink sub-band signal 20D(1) into uplink RF signal 20U is unlikely to affect the corresponding uplink sub-band signal 20U(1).

As with the downlink sub-band isolation circuit 48D(1) above, in this embodiment, the uplink RF signal 20D is downconverted in the uplink sub-band isolation circuit 48U(1) to an IF band in order to more easily and more accurately filter the signals corresponding to the uplink sub-band signal 20U (1). In other embodiments, the uplink RF signal 20U may be filtered directly, without including an IF downconverting step. In the embodiment of FIG. 6, the filtered IF signal is next received by a second uplink mixer 82(1), which upconverts the filtered IF signal to the uplink sub-band signal 20U(1). The uplink sub-band signal 20U(1) is next output into the uplink combiner 50. As discussed above, each uplink sub-band signal 20U(1)-20U(N) is sufficiently separated from each respective downlink sub-band signal 20D(1)-20(N), which allows the uplink combiner 50 to reconstruct a "clean" uplink RF signal for use by the DAS 12. This is because each uplink sub-band signal 20U(1)-20U(N) is sufficiently isolated from the respective downlink sub-band signal 20D(1)-20D(N) that leakage from any individual downlink sub-band signal 20D(1)-20D(N) does not affect any of the component uplink sub-band signals 20U(1)-20U(N). Thus, the combined "clean" uplink sub-band signal 20U(1)-20U(N) can be reconstructed into a "clean" uplink RF signal 20U by the uplink combiner 50.

Figure 7:
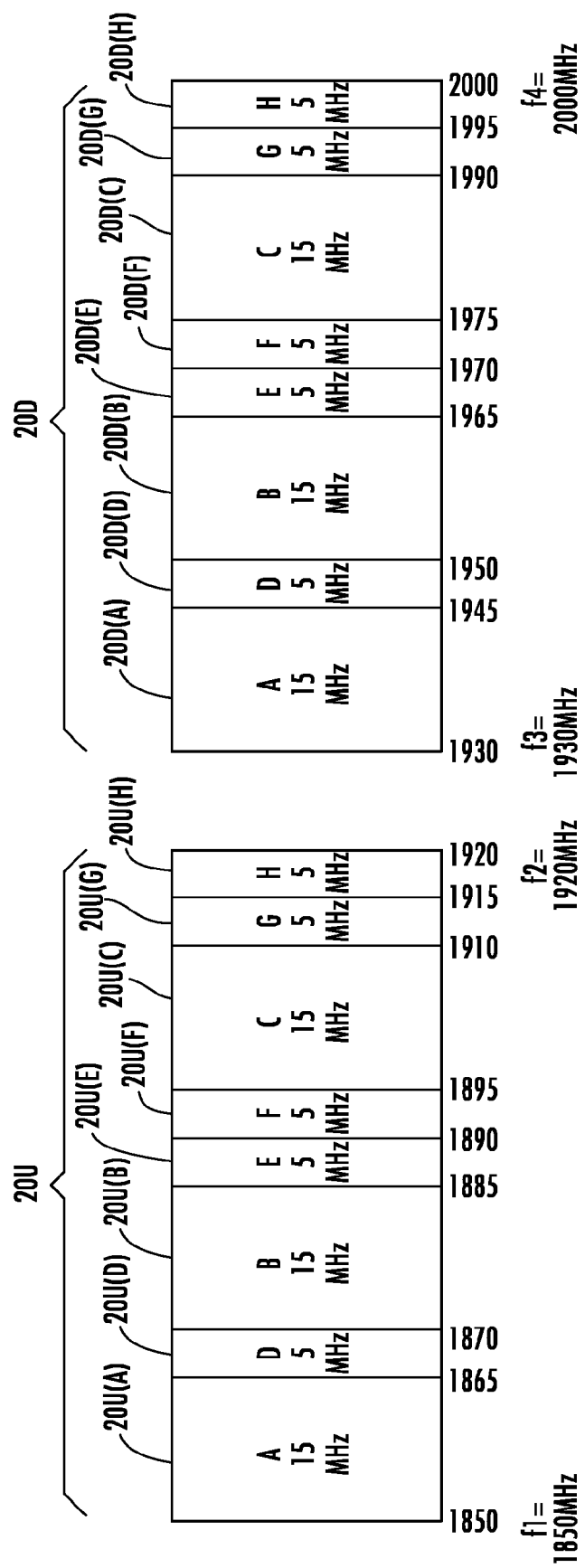
FIG. 7 is a diagram of an exemplary downlink RF signal and uplink RF signal each having a bandwidth, wherein each RF signal is divided into eight sub-bands having different bandwidths such that each downlink sub-band has frequency separation from a respective uplink sub-band greater than the frequency separation between the downlink RF signal and uplink RF signal.

The above described embodiments may be adapted for use with different numbers of sub-bands within each pair of downlink and uplink RF signals 20D, 20U. In this regard, FIG. 7 is a diagram of an exemplary downlink RF signal and uplink RF signal each having a bandwidth, wherein each RF signal is divided into eight sub-bands having different bandwidths such that each downlink sub-band has frequency separation from a respective uplink sub-band greater than the frequency separation between the downlink RF signal and uplink RF signal. In this example, similar to embodiments above, the uplink RF signal 20U is between f1 (1850 MHz) and f2 (1920 MHz) and the downlink RF signal 20D is between f3 (1930 MHz) and f4 (2000 MHz), for a separation of 10 MHz. In this embodiment, uplink sub-band signal 20U (A) includes 1850-1865 MHz and downlink sub-band signal 20D(A) includes 1930-1945 MHz, accordingly having a frequency separation of 65 MHz. Uplink sub-band signal 20U (B) includes 1870-1885 MHz and downlink sub-band signal 20D(B) includes 1950-1965 MHz, accordingly also having a frequency separation of 65 MHz. Uplink sub-band signal 20U(C) includes 1895-1910 MHz and downlink sub-band signal 20D(C) includes 1975-1990 MHz, accordingly also having a frequency separation of 65 MHz. Uplink sub-band signal 20U(D) includes 1865-1870 MHz and downlink sub-band signal 20D(D) includes 1945-1950 MHz, accordingly having a frequency separation of 75 MHz. Uplink sub-band signal 20U(E) includes 1885-1890 MHz and downlink sub-band signal 20D(E) includes 1965-1970 MHz, accordingly also having a frequency separation of 75 MHz. Uplink sub-band signal 20U(F) includes 1890-1895 MHz and downlink sub-band signal 20D(F) includes 1970-1975 MHz, accordingly also having a frequency separation of 75 MHz. Uplink sub-band signal 20U(G) includes 1910-1915 MHz and downlink sub-band signal 20D(G) includes 1990-1995 MHz, accordingly also having a frequency separation of 75 MHz. Uplink sub-band signal 20U(H) includes 1915-1920 MHz and downlink sub-band signal 20D(H) includes 1995-2000 MHz, accordingly also having a frequency separation of 75 MHz. Thus, in the example embodiment of FIG. 7, downlink and uplink RF signals 20D, 20U are each divided into eight different sub-bands, each having separation from the corresponding sub-band of 65-75 MHz. This allows for much less leakage and noise from downlink RF signal 20D into uplink RF signal 20U, because each pair of sub-band signals has greater separation therebetween than the 10 MHz of separation between downlink and uplink RF signals 20D, 20U.

Figure 8:
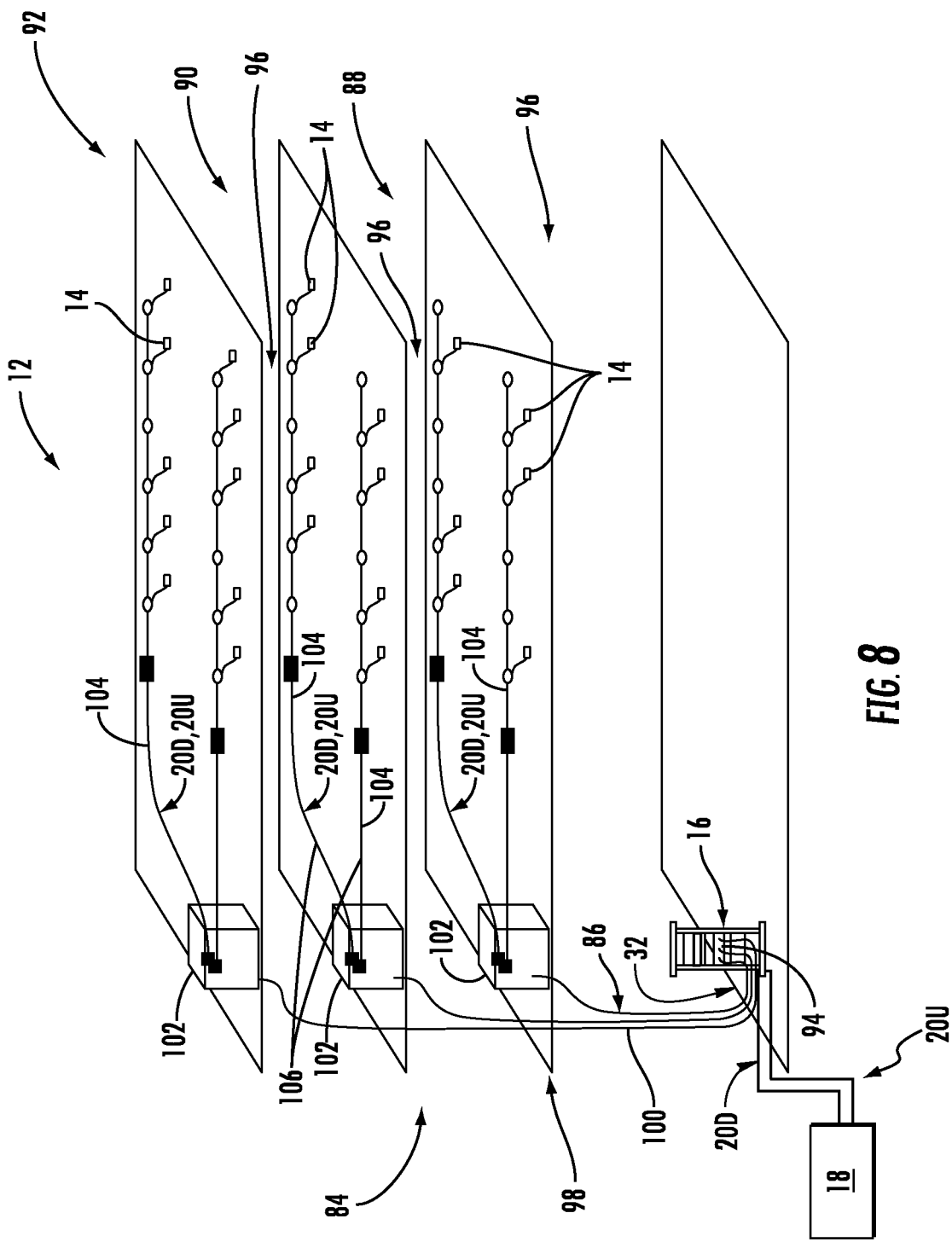
FIG. 8 is a partially schematic cut-away diagram of an exemplary building infrastructure in which the DASs employing frequency independent isolation of duplexed ports disclosed herein can be employed.

The DAS 12 employing the sub-band separation circuit 42 in FIGS. 3-6 can be provided in any environment desired. For example, the DAS 12 may be deployed indoors. To provide further exemplary illustration of how the DAS 12 can be deployed indoors, FIG. 8 is provided. FIG. 8 is a partially schematic cut-away diagram of a building infrastructure 84 employing the DAS 12. The building infrastructure 84 generally represents any type of building in which the DAS 12 can be deployed. As previously discussed with regard to FIG. 3, the DAS 12 incorporates the head-end unit 16 to provide various types of communications services to coverage areas within the building infrastructure 84, as an example.

For example, as discussed in more detail below, the DAS 12 in this embodiment is configured to receive the downlink communications signals 20D and distribute the downlink communications signals 20D to remote units 14. For example, if the DAS 12 is an optical fiber-based DAS as illustrated in FIGS. 3-6, the downlink communications signals 20D are distributed over optical fiber 86 to multiple remote units 14 in a point to multi-point configuration. The DAS 12 in this embodiment can be, for example, an indoor distributed antenna system (IDAS) to provide wireless service inside the building infrastructure 84. These wireless signals can include cellular service, wireless services such as RFID tracking, Wireless Fidelity (WiFi), local area network (LAN), WLAN, public safety, wireless building automations, and combinations thereof, as examples.

With continuing reference to FIG. 8, the building infrastructure 84 in this embodiment includes a first (ground) floor 88, a second floor 90, and a third floor 92. The floors 88, 90, 92 are serviced by the head-end unit 16 through a main distribution frame 94 to provide antenna coverage areas 96 in the building infrastructure 84. Only the ceilings of the floors 88, 90, 92 are shown in FIG. 8 for simplicity of illustration. In the example embodiment, a main cable 98 has a number of different sections that facilitate the placement of a large number of remote units 14 in the building infrastructure 84. Each remote unit 14 in turn services its own coverage area in the antenna coverage areas 96. The main cable 98 can include, for example, a riser cable 100 that carries all of the downlink and uplink optical fibers 86 to and from the head-end unit 16. The riser cable 100 may be routed through an interconnect unit (ICU) 102. The ICU 102 may be provided as part of or separate from the power supply (not shown). The ICU 102 may also be configured to provide power to the remote units 14 via the electrical power line (not shown) provided inside an array cable 104, or tail cable or home-run tether cable as other examples, and distributed with the optical fibers 86 to the remote units 14.

The main cable 98 enables multiple optical fiber cables 106 to be distributed throughout the building infrastructure 84 (e.g., fixed to the ceilings or other support surfaces of each floor 88, 90, 92) to provide the antenna coverage areas 96 for the first, second, and third floors 88, 90 and 92. In an example embodiment, the head-end unit 16 is located within the building infrastructure 84 (e.g., in a closet or control room), while in another example embodiment, the head-end unit 16 may be located outside of the building infrastructure 84 at a remote location. The base station 18, which may be provided by a second party such as a cellular service provider, is connected to the head-end unit 16 through the duplexer port 32, as previously discussed. The base station 18 is any station or signal source that provides the downlink communications signals 20D to the head-end unit 16 and can receive return uplink communications signals 20U from the head-end unit 16.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A sub-band separation circuit for providing band separation between sub-bands of downlink communications signals and uplink communications signals in a remote unit of a distributed antenna system (DAS), comprising:
   a downlink splitter configured to:
      receive a downlink communications signal having a downlink bandwidth comprising a plurality of downlink communications sub-bands on a downlink splitter input; and
      split the received downlink communications signal into a plurality of split downlink communications signals on a plurality of splitter outputs;
   a plurality of sub-band isolation circuits, each sub-band isolation circuit comprising:
      a downlink isolation circuit configured to:
         receive a split downlink communications signal among the plurality of split downlink communications signals from a split output among the plurality of splitter outputs; and
         isolate at least one downlink communications sub-band among the plurality of downlink communications sub-bands in the split downlink communications signal to generate a communications sub-band signal; and
      a duplexer configured to:
         receive the communications sub-band signal on a downlink duplexer input;
         receive an uplink communications signal on an antenna interface coupled to an antenna; and
         pass the communications sub-band signal to the antenna interface.

2. The sub-band separation circuit of claim 1, wherein each sub-band isolation circuit further comprises an uplink isolation circuit configured to:
   receive the uplink communications signal from the duplexer, wherein the uplink communications signal has an uplink bandwidth comprising a plurality of uplink communications sub-bands; and
   isolate at least one uplink communications sub-band among the plurality of uplink communications sub-bands in the uplink communications signal to generate an uplink communications sub-band signal;
   wherein the sub-band separation circuit further comprises an uplink combiner configured to:
      receive the plurality of uplink communications sub-band signals from the plurality of sub-band isolation circuits on a respective plurality of uplink combiner inputs; and
      combine the plurality of uplink communications sub-band signals into the uplink communications signal on an uplink combiner output.

3. The sub-band separation circuit of claim 2, wherein, for each sub-band isolation circuit, the difference between a minimum frequency of the sub-band of the corresponding downlink sub-band signal and a maximum frequency of the sub-band of the corresponding uplink communications sub-band signal is larger than a minimum frequency of the downlink bandwidth and a maximum frequency of the uplink bandwidth.

4. The sub-band separation circuit of claim 2, wherein, for each sub-band isolation circuit, the difference between a minimum frequency of the sub-band of the corresponding uplink communications sub-band signal and a maximum frequency of the sub-band of the corresponding downlink sub-band signal is larger than a minimum frequency of the uplink bandwidth and a maximum frequency of the downlink bandwidth.

5. The sub-band separation circuit of claim 2, wherein a minimum frequency of one of the downlink bandwidth and uplink bandwidth is equal to or less than 10 MHz higher than a maximum frequency of the other of the downlink bandwidth and uplink bandwidth.

6. The sub-band separation circuit of claim 1, wherein the downlink and uplink communications signals are RF signals, and, for each sub-band isolation circuit, the downlink isolation circuit comprises:
   a first downlink mixer configured to receive the downlink RF signal and downconvert the downlink RF signal to a downlink intermediate frequency (IF) signal corresponding to the downlink RF signal;
a downlink sub-band filter configured to receive the downlink IF signal and filter the downlink IF signal and generate a downlink IF sub-band signal corresponding to the downlink RF sub-band signal associated with the sub-band isolation circuit;
a second downlink mixer configured to receive the downlink IF sub-band signal and upconvert the downlink IF sub-band signal to the downlink sub-band signal associated with the sub-band isolation circuit.

7. The sub-band separation circuit of claim 2, wherein the downlink and uplink RF communications signals are RF signals, and, for each sub-band isolation circuit, the uplink isolation circuit comprises:
a first uplink mixer configured to receive the uplink RF signal and downconvert the uplink RF signal to an uplink intermediate frequency (IF) signal corresponding to the uplink RF signal;
an uplink sub-band filter configured to receive the uplink IF signal and filter the uplink IF signal and generate an uplink IF sub-band signal corresponding to the uplink RF sub-band signal associated with the sub-band isolation circuit;
a second uplink mixer configured to receive the uplink IF sub-band signal and upconvert the uplink IF sub-band signal to the uplink communications sub-band signal associated with the sub-band isolation circuit.

8. The sub-band separation circuit of claim 7, wherein, for each sub-band isolation circuit, the downlink isolation circuit comprises:
a first downlink mixer configured to receive the downlink RF signal and downconvert the downlink RF signal to a downlink intermediate frequency (IF) signal corresponding to the downlink RF signal;
a downlink sub-band filter configured to receive the downlink IF signal and filter the downlink IF signal and generate a downlink IF sub-band signal corresponding to the downlink RF sub-band signal associated with the sub-band isolation circuit;
a second downlink mixer configured to receive the downlink IF sub-band signal and upconvert the downlink IF sub-band signal to the downlink sub-band signal associated with the sub-band isolation circuit.

9. A method providing band separation between sub-bands of downlink communications signals and uplink communications signals in a remote unit of a distributed antenna system (DAS), the method comprising:
receiving a downlink communications signal having a downlink bandwidth comprising a plurality of downlink communications sub-bands on a downlink splitter input;
splitting the received downlink communications signal into a plurality of split downlink communications signals;
for each split downlink communications signal, isolating at least one downlink communications sub-band among the plurality of downlink communications sub-bands in the split downlink communications signal to generate a communications sub-band signal; and
passing each communications sub-band signal to an antenna interface of a respective duplexer.

10. The method of claim 9, further comprising:
for each duplexer, receiving, via the antenna interface, an uplink communications signal having an uplink bandwidth comprising a plurality of uplink communications sub-bands;
for each duplexer, isolating at least one uplink communications sub-band among the plurality of uplink communications sub-bands in the uplink communications signal to generate an uplink communications sub-band signal; and
combining the plurality of uplink communications sub-band signals into the uplink communications signal.

11. The method of claim 10, wherein, for each duplexer, the difference between a minimum frequency of the sub-band of the corresponding downlink sub-band signal and a maximum frequency of the sub-band of the corresponding uplink communications sub-band signal is larger than a minimum frequency of the downlink bandwidth and a maximum frequency of the uplink bandwidth.

12. The method of claim 10, wherein, for each duplexer, the difference between a minimum frequency of the sub-band of the corresponding uplink communications sub-band signal and a maximum frequency of the sub-band of the corresponding downlink sub-band signal is larger than a minimum frequency of the uplink bandwidth and a maximum frequency of the downlink bandwidth.

13. The method of claim 10, wherein a minimum frequency of one of the downlink bandwidth and uplink bandwidth is equal to or less than 10 MHz higher than a maximum frequency of the other of the downlink bandwidth and uplink bandwidth.

14. The method of claim 9, wherein the downlink and uplink communications communications signals are RF signals, and isolating each downlink communications sub-band comprises:
downconverting the downlink RF signal to a downlink intermediate frequency (IF) signal corresponding to the downlink RF signal;
filtering the downlink IF signal to generate a downlink IF sub-band signal corresponding to the downlink RF sub-band signal; and
upconverting the downlink IF sub-band signal to the downlink sub-band signal.

15. The sub-band separation circuit of claim 10, wherein the downlink and uplink communications signals are RF signals and isolating each uplink communications sub-band signal comprises:
downconverting the uplink RF signal to an uplink intermediate frequency (IF) signal corresponding to the uplink RF signal;
filtering the uplink IF signal to generate an uplink IF sub-band signal corresponding to the uplink RF sub-band signal; and
upconverting the uplink IF sub-band signal to the uplink communications sub-band signal.

16. The sub-band separation circuit of claim 15, wherein isolating each downlink RF sub-band comprises:
downconverting the downlink RF signal to a downlink intermediate frequency (IF) signal corresponding to the downlink RF signal;
filtering the downlink IF signal to generate a downlink IF sub-band signal corresponding to the downlink RF sub-band signal; and
upconverting the downlink IF sub-band signal to the downlink sub-band signal.

17. A distributed antenna system (DAS) comprising:
head-end equipment (HEE);
a plurality of remote units, each configured to receive at least one downlink communications signal from the HEE and transmit at least one uplink communications signal to the HEE, each remote unit comprising:

a sub-band separation circuit for providing band separation between sub-bands of the at least one downlink communications signal and the at least one uplink communications signal in the remote unit, comprising:
a downlink splitter configured to:
receive a downlink communications signal having a downlink bandwidth comprising a plurality of downlink communications sub-bands on a downlink splitter input; and
split the received downlink communications signal into a plurality of split downlink communications signals on a plurality of splitter outputs;
a plurality of sub-band isolation circuits, each sub-band isolation circuit comprising:
a downlink isolation circuit configured to:
receive a split downlink communications signal among the plurality of split downlink communications signals from a split output among the plurality of splitter outputs; and
isolate at least one downlink communications sub-band among the plurality of downlink communications sub-bands in the split downlink communications signal to generate a communications sub-band signal; and
a duplexer configured to:
receive the communications sub-band signal on a downlink duplexer input;
receive an uplink communications signal on an antenna interface coupled to an antenna; and
pass the communications sub-band signal to the antenna interface.

18. The DAS of claim 17, wherein each sub-band isolation circuit further comprises an uplink isolation circuit configured to:
receive the uplink communications signal from the duplexer, wherein the uplink communications signal has an uplink bandwidth comprising a plurality of uplink communications sub-bands; and
isolate at least one uplink communications sub-band among the plurality of uplink communications sub-bands in the uplink communications signal to generate an uplink communications sub-band signal;
wherein the sub-band separation circuit further comprises an uplink combiner configured to:
receive the plurality of uplink communications sub-band signals from the plurality of sub-band isolation circuits on a respective plurality of uplink combiner inputs; and
combine the plurality of uplink communications sub-band signals into the uplink communications signal on an uplink combiner output.

19. The DAS of claim 18, wherein, for each sub-band isolation circuit, the difference between a minimum frequency of the sub-band of the corresponding downlink sub-band signal and a maximum frequency of the sub-band of the corresponding uplink sub-band signal is larger than a minimum frequency of the downlink bandwidth and a maximum frequency of the uplink bandwidth.

20. The DAS of claim 18, wherein, for each sub-band isolation circuit, the difference between a minimum frequency of the sub-band of the corresponding uplink sub-band signal and a maximum frequency of the sub-band of the corresponding downlink sub-band signal is larger than a minimum frequency of the uplink bandwidth and a maximum frequency of the downlink bandwidth.

21. The DAS of claim 18, wherein a minimum frequency of one of the downlink bandwidth and uplink bandwidth is equal to or less than 10 MHz higher than a maximum frequency of the other of the downlink bandwidth and uplink bandwidth.

22. The DAS of claim 17, wherein the downlink and uplink communications signals are RF signals, and, for each sub-band isolation circuit, the downlink isolation circuit comprises:
a first downlink mixer configured to receive the downlink RF signal and downconvert the downlink RF signal to a downlink intermediate frequency (IF) signal corresponding to the downlink RF signal;
a downlink sub-band filter configured to receive the downlink IF signal and filter the downlink IF signal and generate a downlink IF sub-band signal corresponding to the downlink RF sub-band signal associated with the sub-band isolation circuit; and
a second downlink mixer configured to receive the downlink IF sub-band signal and upconvert the downlink IF sub-band signal to the downlink sub-band signal associated with the sub-band isolation circuit.

23. The DAS of claim 18, wherein the downlink and uplink communications signals are RF signals, and, for each sub-band isolation circuit, the uplink isolation circuit comprises:
a first uplink mixer configured to receive the uplink RF signal and downconvert the uplink RF signal to an uplink intermediate frequency (IF) signal corresponding to the uplink RF signal;
an uplink sub-band filter configured to receive the uplink IF signal and filter the uplink IF signal and generate an uplink IF sub-band signal corresponding to the uplink RF sub-band signal associated with the sub-band isolation circuit; and
a second uplink mixer configured to receive the uplink IF sub-band signal and upconvert the uplink IF sub-band signal to the uplink sub-band signal associated with the sub-band isolation circuit.

24. The DAS of claim 23, wherein, for each sub-band isolation circuit, the downlink isolation circuit comprises:
a first downlink mixer configured to receive the downlink RF signal and downconvert the downlink RF signal to a downlink intermediate frequency (IF) signal corresponding to the downlink RF signal;
a downlink sub-band filter configured to receive the downlink IF signal and filter the downlink IF signal and generate a downlink IF sub-band signal corresponding to the downlink RF sub-band signal associated with the sub-band isolation circuit; and
a second downlink mixer configured to receive the downlink IF sub-band signal and upconvert the downlink IF sub-band signal to the downlink sub-band signal associated with the sub-band isolation circuit.

* * * * *